(12) United States Patent
Evans et al.

(10) Patent No.: US 8,176,863 B2
(45) Date of Patent: May 15, 2012

(54) SEWING METHOD FOR SEAT COVER

(75) Inventors: Nancy C. Evans, Clinton Township, MI (US); Scott D. Thomas, Novi, MI (US); William A. Biondo, Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 357 days.

(21) Appl. No.: 12/606,222

(22) Filed: Oct. 27, 2009

(65) Prior Publication Data

US 2010/0043687 A1 Feb. 25, 2010

Related U.S. Application Data

(63) Continuation-in-part of application No. 12/144,712, filed on Jun. 24, 2008, now Pat. No. 7,695,064.

(51) Int. Cl.
*D05B 13/00* (2006.01)
*B60R 21/20* (2011.01)
*D05B 33/00* (2006.01)
*B60N 2/42* (2006.01)

(52) U.S. Cl. ............. 112/475.08; 280/728.3; 280/730.2; 297/216.1

(58) Field of Classification Search ............... 280/730.2, 280/728.1–728.3, 743.1; 297/216.1, 216.13; 112/475.08, 475.17, 470.27
See application file for complete search history.

(56) References Cited

U.S. PATENT DOCUMENTS

| | | | | |
|---|---|---|---|---|
| 6,029,993 A | * | 2/2000 | Mueller | 280/730.2 |
| 6,254,122 B1 | * | 7/2001 | Wu et al. | 280/730.2 |
| 7,690,723 B2 | * | 4/2010 | Evans et al. | 297/216.13 |
| 7,967,328 B2 | * | 6/2011 | Wieczorek et al. | 280/728.3 |
| 2009/0001784 A1 | * | 1/2009 | Wieczorek et al. | 297/216.1 |
| 2009/0243266 A1 | * | 10/2009 | Smith | 280/730.2 |
| 2009/0315373 A1 | * | 12/2009 | Thomas et al. | 297/216.13 |

* cited by examiner

*Primary Examiner* — Ismael Izaguirre

(57) ABSTRACT

A method is provided for sewing a seat cover to provide a front panel and a side panel with an L-shaped separable seam and inner and outer chutes for air bag deployment. The method comprises sewing the front panel and the inner chute together with permanent vertical extending and horizontal extending seams that will not break during air bag deployment, and sewing the side panel and the outer chute together with permanent vertical extending seams and horizontal extending seams that will not break during air bag deployment. And thereafter sewing the front panel and the side panel together with separable vertical extending seams and horizontal extending seams that will break upon the air bag deployment to allow inflation of the air bag while the inner chute remains attached to the front panel and the outer chute remains attached to the side panel to guide the inflating air bag.

14 Claims, 11 Drawing Sheets

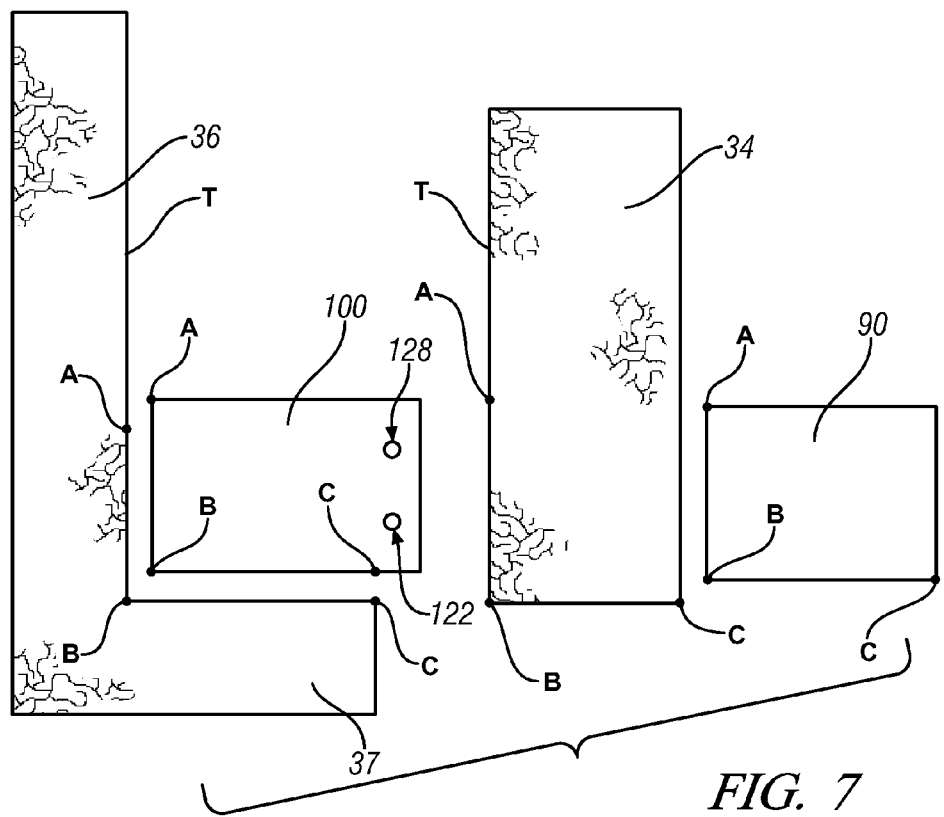
FIG. 7
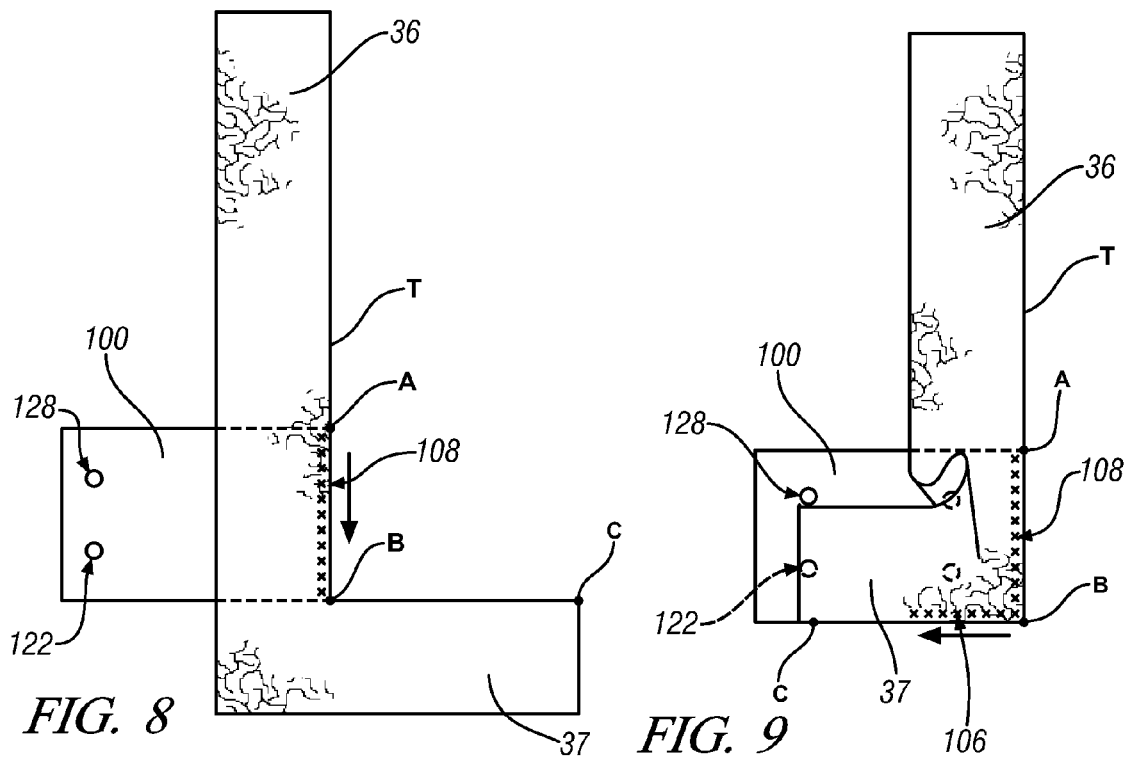
FIG. 8
FIG. 9

SEWING METHOD FOR SEAT COVER

This application is a continuation-in-part of U.S. patent application Ser. No. 12/144,712 filed Jun. 24, 2008, and entitled "Vehicle Seat Side Air Bag".

FIELD OF THE INVENTION

The present invention relates to a vehicle seat having a side impact air bag and more particularly a method for sewing the seat cover to form a continuous L-shaped separable seam and air bag deployment chute.

BACKGROUND OF THE INVENTION

It is well known in the automotive industry to provide a vehicle seat having an air bag mounted on the outboard side of the seat back to provide side impact restraint of a seated occupant. The air bag may include a thorax portion that inflates forwardly of the occupant torso, a head portion that inflates more upwardly and forwardly to restrain the occupant head, and a pelvis portion that inflates more downwardly and forwardly to restrain the occupant pelvis. The air bag is folded up and stored within an air bag housing that is mounted on the seat back. In some cases a plastic door conceals the folded up air bag and then the door opens to permit the deployment of the air bag forwardly and downwardly. However, it is generally considered to be more aesthetically acceptable to hide the air bag assembly within the seat back beneath the traditional seat cover and to provide the seat trim cover with separable seams that can break apart to permit the air bag to deploy forwardly and downwardly.

It would be desirable to provide an improved method for sewing the seat cover to form a continuous L-shaped separable seam and air bag deployment chute.

SUMMARY OF THE INVENTION

A method is provided for sewing a seat cover to provide a front panel and a side panel with an L-shaped separable seam and inner and outer chutes for air bag deployment. The method comprises sewing the front panel and the inner chute together with permanent vertical extending and horizontal extending seams that will not break during air bag deployment, and sewing the side panel and the outer chute together with permanent vertical extending seams and horizontal extending seams that will not break during air bag deployment. Thereafter, the front panel and the side panel are sewn together with separable vertical extending seams and horizontal extending seams that will break upon the air bag deployment to allow inflation of the air bag while the inner chute remains attached to the front panel and the outer chute remains attached to the side panel to guide the deployment of the inflating air bag.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is a plan view showing the pieces of material that will be sewn together to make the seat front panel, side panel, and the inner and outer chutes.

FIG. 8 shows the first step in sewing the front panel to the inner chute.

FIG. 9 shows the second step in sewing the front panel to the inner chute.

DETAILED DESCRIPTION OF THE EXEMPLARY EMBODIMENTS

The following description of certain exemplary embodiments is merely exemplary in nature and is not intended to limit the invention, its application, or uses.

Figure 1:
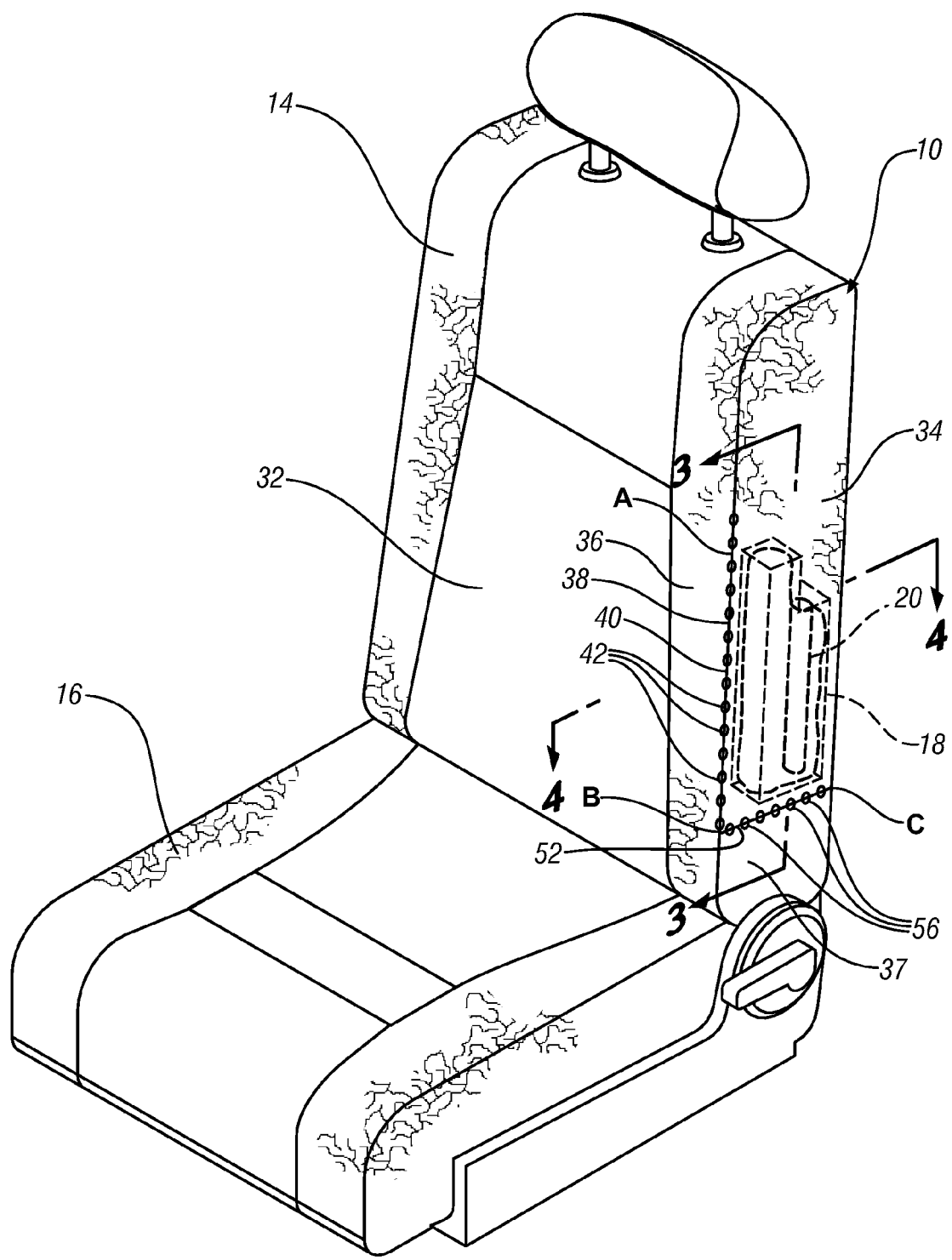
FIG. 1 is a perspective view of a vehicle seat having a side air bag.
Figure 2:
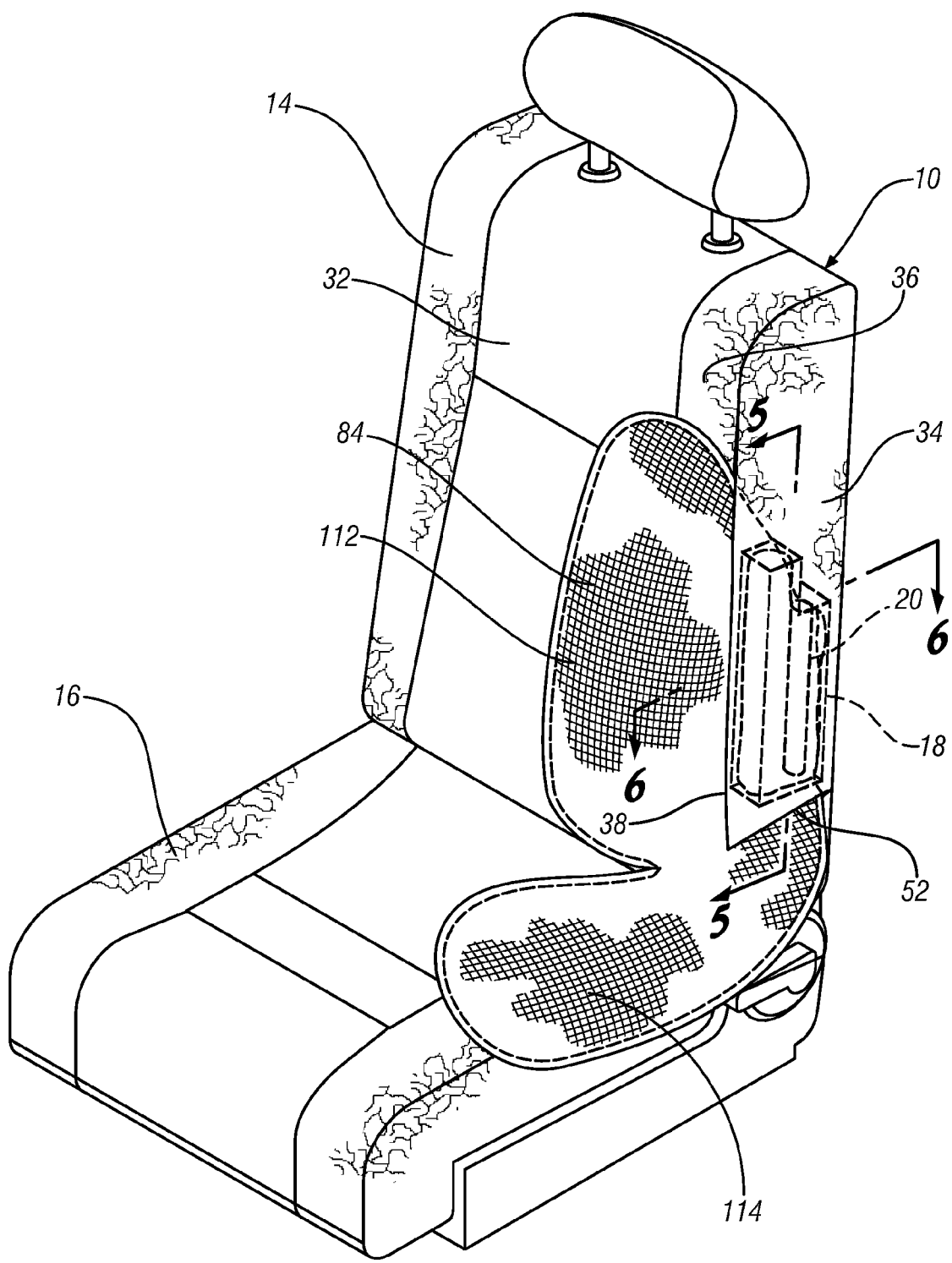
FIG. 2 is a view similar to FIG. 1 but showing the air bag to have been inflated and deployed as permitted by separation of a continuous separable seam of the seat trim cover.
Figure 3:
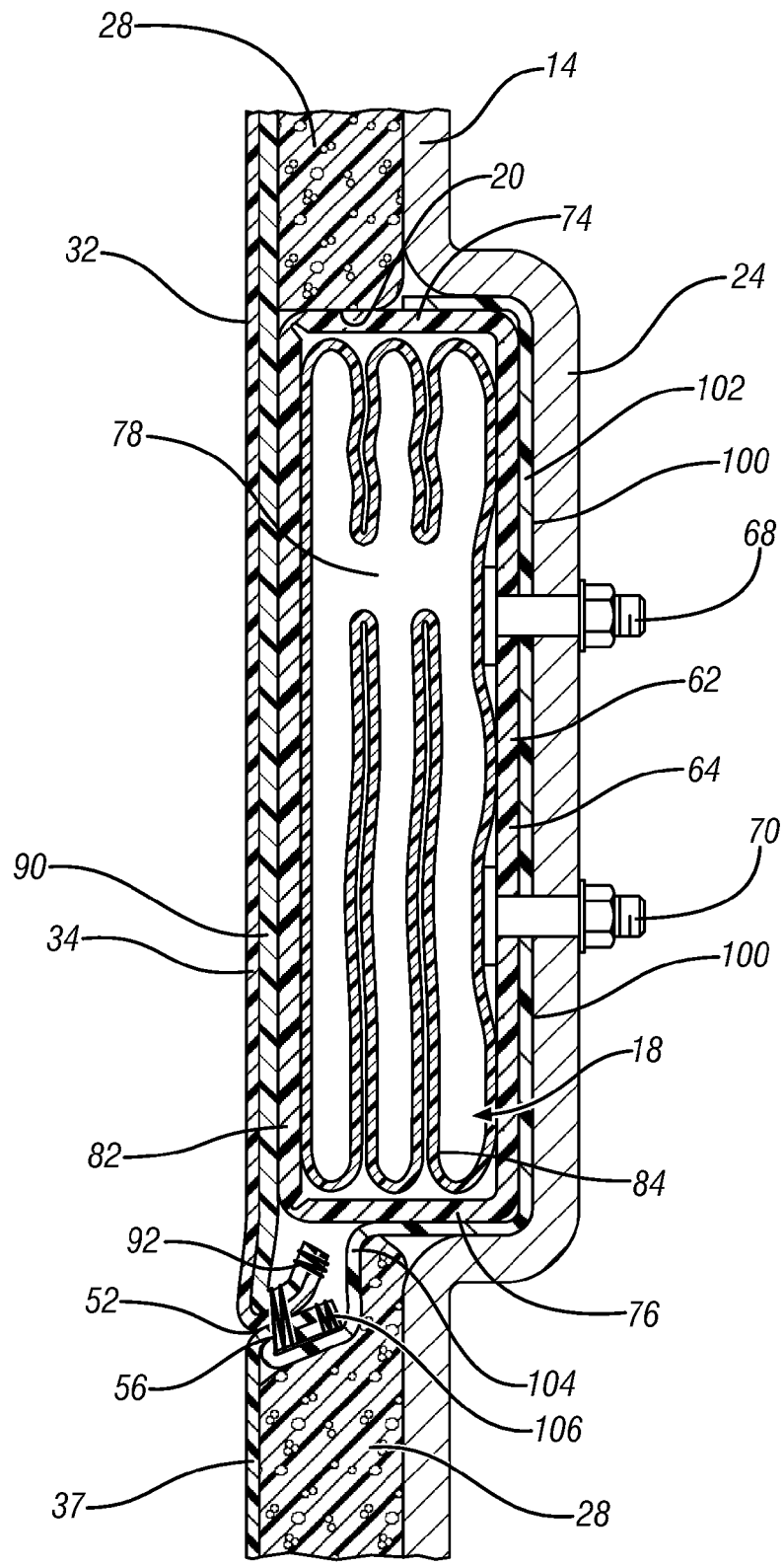
FIG. 3 is a section view taken in the direction of arrows 3-3 of FIG. 1.
Figure 4:
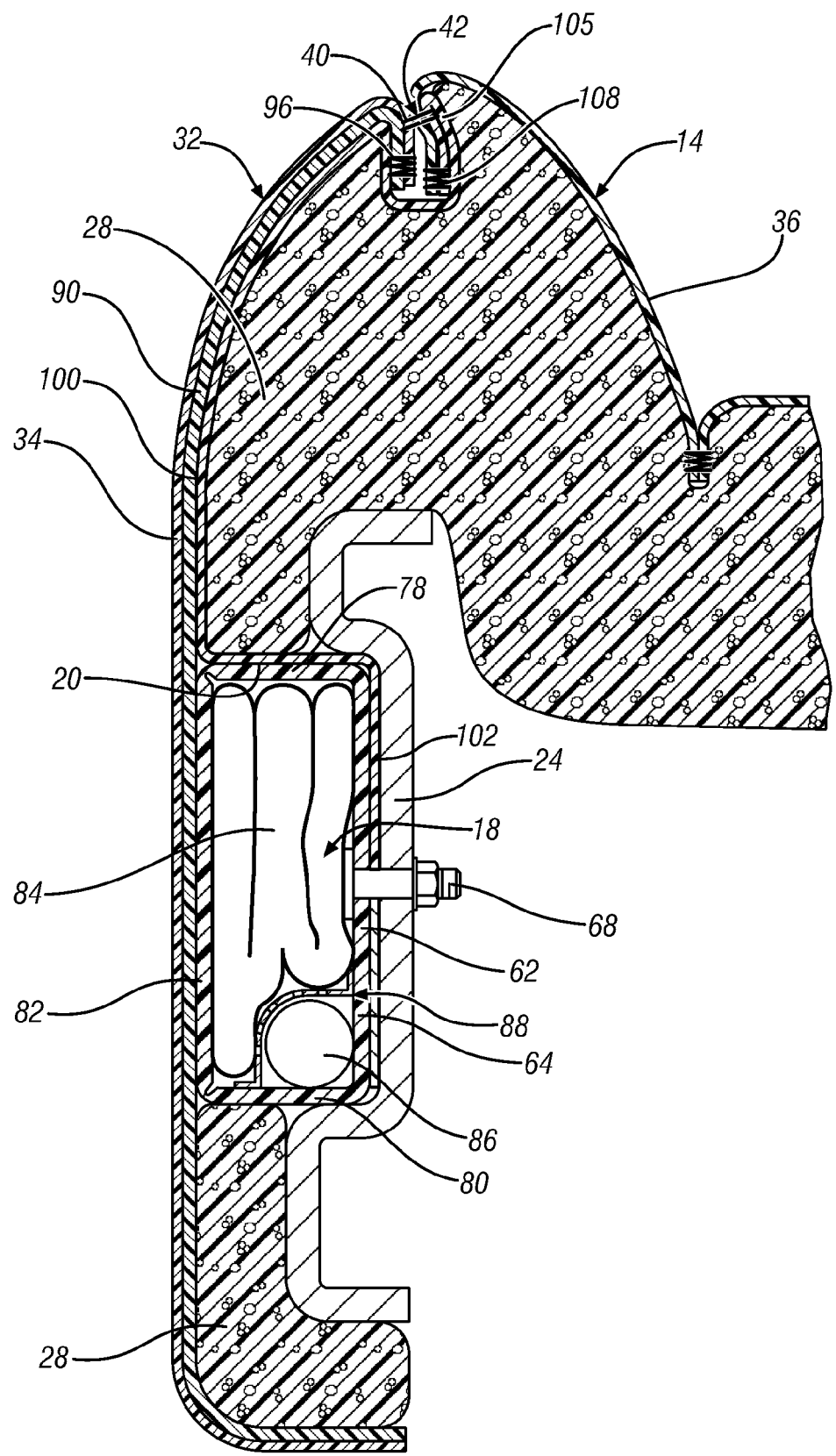
FIG. 4 is a section view taken in the direction of arrows 4-4 of FIG. 1.

Referring to FIGS. 1 and 2, a vehicle seat generally indicated at 10 includes a seat back 14 and a seat bottom 16. An air bag assembly, generally indicated at 18, is mounted within a hollow 20 in the seat back 14. As seen in FIGS. 3 and 4, the seat back 14 includes a seat frame 24 of stamped metal construction. A foam seat cushion 28 covers the frame 24 and is suitably attached thereto. The foam cushion 28 is concealed beneath a seat cover 32, such as a woven cloth, vinyl, or leather.

As best seen in FIGS. 1 and 4, the seat cover 32 includes a side panel 34 and a front panel 36. The front panel 36 includes a lower extension 37 that reaches onto the side of seat and is located beneath the lower edge of the side panel 34. As best seen in FIGS. 1, 3 and 4, the side panel 34, the front panel 36 and extension 37 are joined together by a separable seam 38, comprised of a vertical extending section 40, formed by a series of breakaway stitches 42, between the side panel 34 and the front panel 36, and a horizontal extending section 52, formed by a series of breakaway stitches 56, between the side panel 34 and the front panel lower extension 37. Referring again to FIG. 1, it is seen that the separable seam 38 is formed continuously from the breakaway stitches 42 forming the vertical extending tear seam section 40 beginning above point "A" and the breakaway stitches 56 forming the horizontal extending tear seam section 52 beginning at the point designated "B". Also, the breakaway stitches 56 forming the horizontal extending tear seam 52 have a rear end at point "C". Thus, as seen in FIG. 1, the overall shape of the separable seam 38 formed of seam sections 40 and 52 is an L-shaped tear seam arrangement A to B to C adjacent the air bag assembly 18 on the outboard side of the seat back 14. Upon inflation of the air bag, the separable L-shaped tear seam arrangement will be overcome as will be described hereinafter to allow the inflating air bag to deploy from the seat 10 as seen in FIG. 2.

Referring to FIGS. 3 and 4, it is seen that the air bag assembly 18 includes an air bag housing 62 having a base wall 64 that is attached to the seat frame 24 by bolts or mounting studs 68 and 70. The housing 62 has side walls including upper side wall 74, lower side wall 76, front side wall 78 and rear side wall 80. The side walls 74, 76, 78 and 80 are connected by a hinged cover 82 that conceals a folded up air bag 84 and an inflator 86. The air bag housing 62 is conventionally constructed of plastic or fabric or a combination of plastic and fabric. In addition, the air bag housing 62 can also partially consist of an inflator mounting bracket in numerous configurations. An example of a mounting bracket 88 is shown in FIG. 4.

Referring to FIG. 3, it is seen that the side panel 34 of the seat cover is lined with an outer chute 90 that has a lower end sewn to the lower end of the side panel 34 adjacent to the separable seam section 52 by stitches at 92. And, as seen in FIG. 4, the outer chute 90 also has a forward end which is sewn to the forward end of the side panel 34 adjacent to the separable seam section 40 by stitches 96. The outer chute 90 is of a material that is less stretchable than the seat cover 32 material of the side panel 34 and has a smooth surface finish to allow the low friction passage of the air bag 84 thereagainst.

FIGS. 3 and 4 also show an inner chute 100 that has a base portion 102 that is captured between the base wall 64 of the air bag housing 62 and the seat frame 24. As seen in FIG. 7, the base portion 102 of the inner chute 100 has holes 122 and 128 which fit over the mounting studs 68 and 70 to fixedly anchor the inner chute 100. As seen in FIG. 3, the inner chute 100 includes a lower edge portion 104 that extends downwardly and is sewn to the lower extension 37 of the side panel 34 adjacent to the separable seam section 52 by stitches at 106. FIG. 4 shows that the inner chute 100 extends forwardly between the foam cushion 28 and the side panel 34 all the way forward to the separable seam section 40 where the forwardmost end 105 of the inner chute 100 is sewn to the front panel 36 of the seat cover adjacent to the separable seam section 40 by stitches 108. The inner chute 100 is made of a material that is less stretchable than the seat cover 32 material of the front panel 36 and offers a smooth low friction surface to allow the low friction passage of the air bag 84 against the foam cushion 28.

Figure 5:
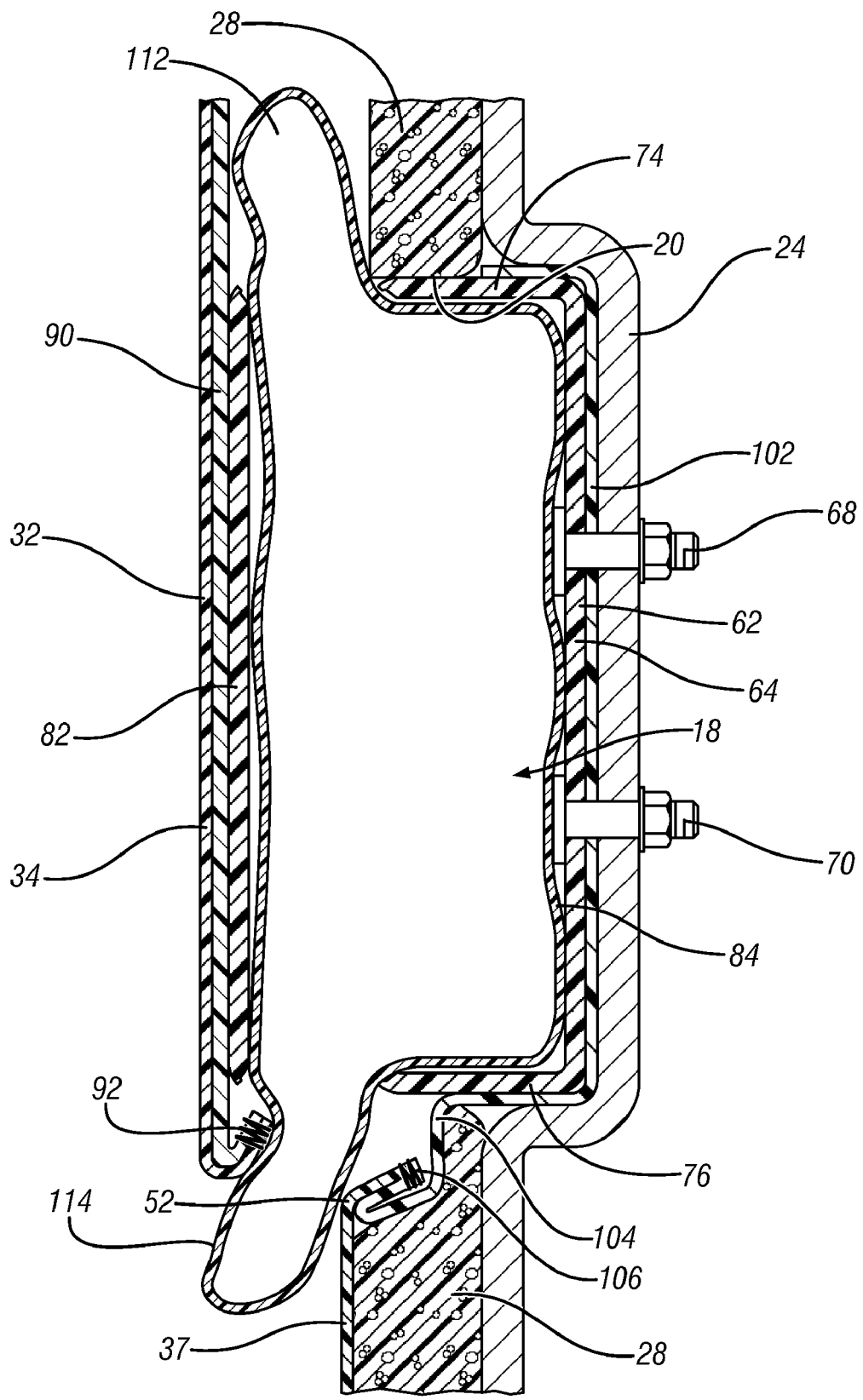
FIG. 5 is a view similar to FIG. 3 but showing the air bag being inflated and causing a separation of the horizontal extending separable seam section.
Figure 6:
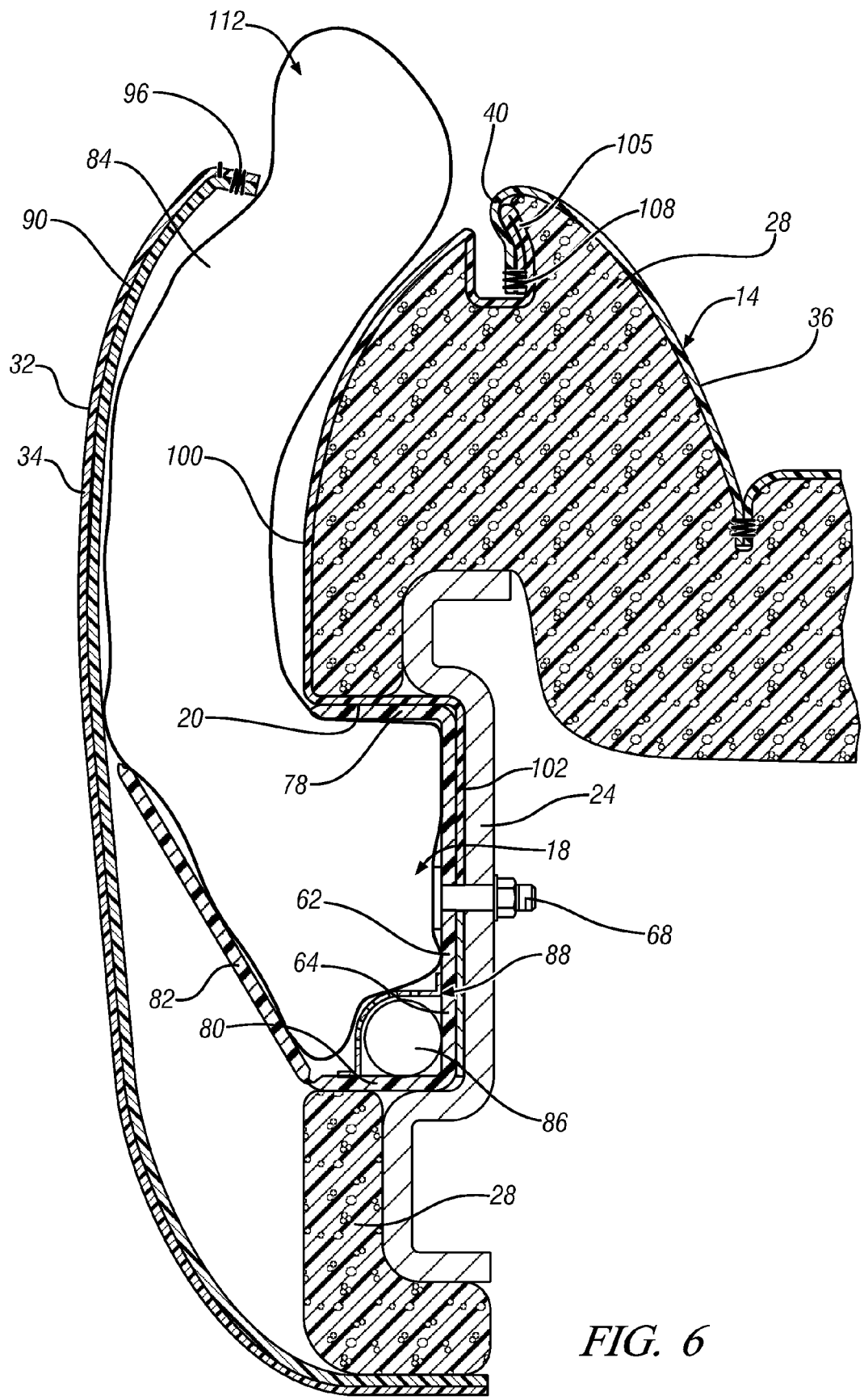
FIG. 6 is a section view similar to FIG. 4 but showing the air bag being inflated and causing separation of the vertical extending separable seam section.

FIGS. 2, 5 and 6 show the inflation of the air bag assembly 18. In particular, FIG. 2 shows that the air bag 84 includes an upper thorax portion 112 and a lower pelvis portion 114. In FIG. 5, it is seen that upon activation of the inflator 86, the air bag 84, including both its upper thorax portion 112 and the lower pelvis portion 114, have begun to inflate outwardly of the air bag housing 62 as permitted by hinging of the hinged cover 82. As seen in FIG. 5, the horizontally extending separable seam section 52 at the lower edge of the air bag housing 62 has been separated by the breaking of the stitches 56 to permit the emergence of the lower pelvis portion 114. Also as shown in FIG. 6, the emergence of the upper thorax portion 112 has likewise caused the opening of the vertical extending separable seam section 40 via the breaking of the breakaway stitches 42 at the juncture between the side panel 34 and the front panel 36. It will be understood that during the inflation of the air bag 84, the inner chute 100 will function to prevent stretching of the side panel 34 so that the force of the air bag 84 acting upon the outer chute 90 will be transmitted effectively to the breakaway stitches 42 and 56. Likewise, the inner chute 100 will function in a similar manner to effectively anchor and restrain front panel 36, the lower extension 37 of front panel 36, and the side panel 34, so that the force generated by the inflating air bag 84 is effectively focused at the breakaway stitches 42 and 56. Thus as seen in FIG. 2, the vertical extending separable seam section 40 and the horizontal extending separable seam section 52, will enable the inflating air bag to efficiently break out of its stored and hidden position of FIG. 1 to expedite its arrival at the fully inflated occupant restraining positions of FIG. 2.

FIGS. 7-15 show the steps of a method for sewing together the front panel 36, inner chute 100, side panel 34, and outer chute 90. In FIGS. 7-15 the following conventions are used and will assist the reader in understanding the drawings:

a. the front panel and the side panel are always shown in their eventual car position corresponding to FIG. 1, rather than attempting to show the rotation of the panels and chute pieces that will be executed by a skilled sewing machine operator in order to move the pieces through the sewing machine for sewing of the seams.

b. the reference letter T will be used to indicate what will become the top end of the vertical extending part of the L-shaped tear seam, the letter A indicates the top edge of the chutes in the vertical extending tear seam, the letter B identifies what will become the intersection point of the vertical and horizontal extending tear seam sections, and the letter C indicates the rearward end of the horizontal extending inner seam.

c. although not shown in the drawings, a person of ordinary skill in the art knows that each of the piece of fabric to be sewn will have a seam allowance provided thereon to accommodate the placement of the rows of stitches. A seam allowance is the area between the edge and the stitching line of two or more pieces of material stitched together.

d. in the drawings, the symbol "x" is used to denote stitches that are permanent and will not normally tear. These stitches "x" are sewn using a thread that has sufficient strength and a stitches-per-inch count that will assure that these stitches will not break during normal use of the vehicle seat or during the deployment of the airbag. The symbol "o" is used to denote stitches that are designed to breakaway in response to the forces imposed by the inflating air bag. Thus these stitches "o" are made using a thread strength and stitches-per-inch count such that the stitches will hold during normal use of the seat, but breakaway in response to force applied by the inflating air bag.

e. the show surface of the side panel 34 and the front panel 36 is designated by wavy lines to indicate the graining that is common on the surface of vinyl pieces, and the back surface of the panels 34 and 36 are designated by a patch of crosshatching as often a sheet of reinforcing fabric is bonded to the back side of the vinyl surface.

f. for ease of illustration, the side panel 34, front panel 36, inner chute 100, and outer chute 90 are shown as simple geometric representations, not as pieces with complex curved surfaces with matching lengths as would be expected on an actual seat cover.

Referring to FIG. 7 it is seen that the front panel 36 is a generally L-shaped piece of seat covering vinyl, but may be cloth or leather material. The inner chute 100 is a rectangular piece of the chute material and has holes 122 and 128 therein which will receive the mounting studs of the airbag inflator. The side panel 34 is a generally rectangular piece of seat covering vinyl, but may be cloth or leather. In FIG. 7 the reference letter A indicates the top edge of the chutes in the vertical extending tear seam, B identifies what will become the intersection point of the vertical and horizontal extending tear seams, and C indicates the rearward end of the horizontal extending inner seam.

Figure 10:
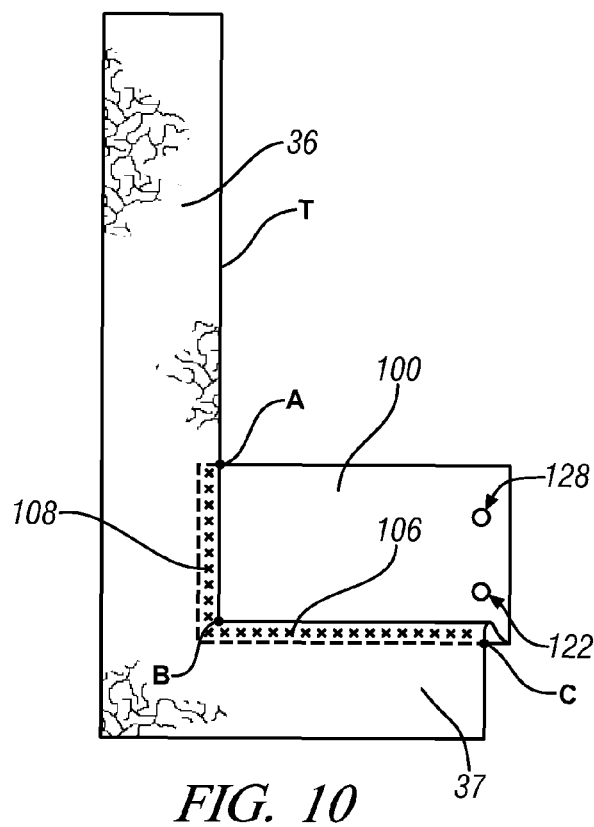
FIG. 10 shows the completed front panel sewn to the inner chute.

FIGS. 8-10 show the sewing of the front panel 36 to the inner chute 100. Referring to FIG. 8 it is seen that the inner chute 100 has been turned over from its position in FIG. 7, and placed under the front panel 36. The front panel 36 and the inner chute 100 are sewn together from A to B by stitches 108. Although not shown in the drawings, a person of ordinary skill in the art knows that both of the front panel 36 and the inner chute 100 will have a seam allowance provided thereon to accommodate the placement of the row of stitches 108. A seam allowance is the area between the edge and the stitching line of two or more pieces of material stitched together.

Proceeding to FIG. 9, the extension 37 has been rotated and lifted to lie atop the inner chute 100, and a horizontal row of stitches 106 is sewn from B to C. The sewing needle is preferably left in the materials at point B as the materials are reoriented from the position of FIG. 8 to the position of FIG. 9. In this way the seam from A to B to C will be of a continuous thread. However although more time consuming, the needle can be removed and the thread terminated upon reaching point B, and then the sewing can be restarted to sew from B to C. Also, it will be appreciated that the order of the sewing of the front panel 36 to the inner chute 100 can be reversed to sew from C to B to A, by performing the sewing of FIG. 9 prior to the sewing of FIG. 8 and in the reverse direction, with the two pieces flipped over so that the inner chute 100 is on top of the front panel 36.

Then, in FIG. 10 the inner chute 100 has been rotated out from underneath the front panel 36 and the lower extension 37 has been straightened out so that in FIG. 10 the front panel 36, the lower extension 37, and the inner chute 100 are shown in the car position.

Figure 11:
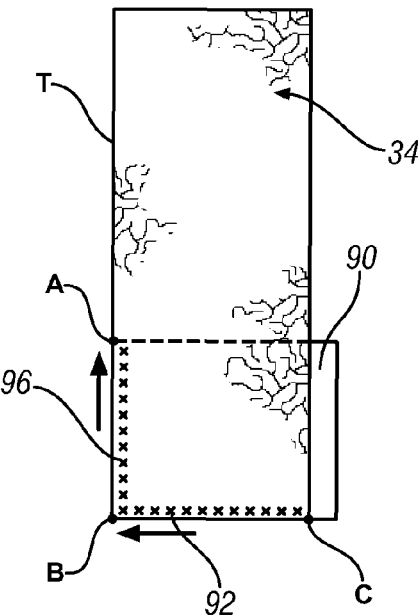
FIG. 11 shows the sewing of the side panel to the outer chute.

FIG. 11 shows the sewing of the outer chute 90 to the side panel 34. As seen in FIG. 11, side panel 34 is laid atop the outer chute 90, and seams are sewn between the edges thereof, including a horizontal row of stitches 92 proceeding from C to B, and a vertical row of stitches 96 proceeding from B to A.

Thus, to summarize, in FIGS. 8-10 the front panel 36 has been permanently sewn to the inner chute 100. And in FIG. 11, the side panel 34 has been permanently sewn to the outer chute 90. Alternatively, rather than sewing these seams, these pieces are simply held together as shown, and the separable L-shaped seam 38 between the front panel 36 and the side panel 34 is sewn as described below and shown in FIGS. 12-15.

Figure 12:
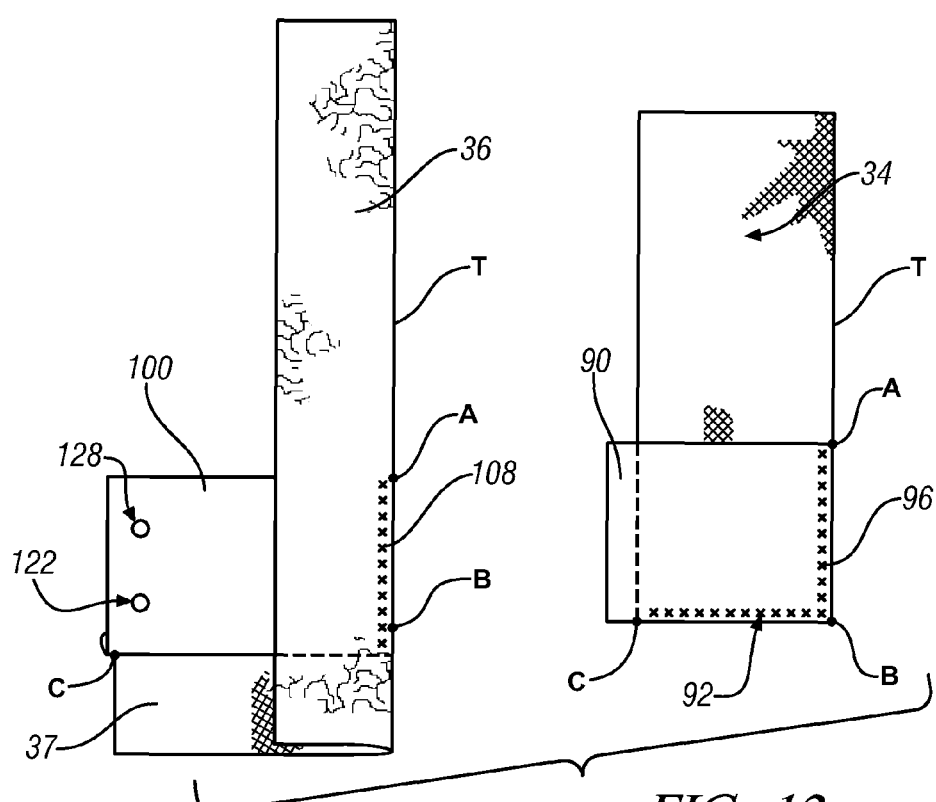
FIG. 12 shows the first step in preparing the two subassemblies to sew the separable seam.

FIGS. 12-15 will show the sewing of the separable L-shaped seam 38 between the front panel 36 and the side panel 34. As seen in FIG. 12, the inner chute 100 and the lower extension 37 have been folded under so that the row of vertical stitches A-B is exposed. FIG. 12 also shows that the side panel 34 and the outer chute 90 have been turned over so the outer chute 90 is on top.

Figure 13:
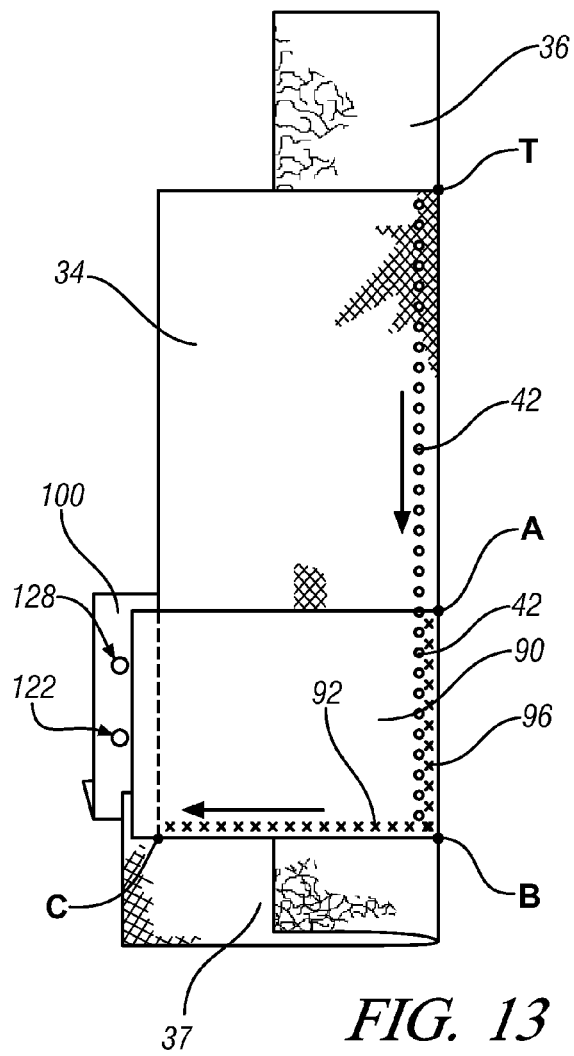
FIG. 13 shows the sewing of the vertical extending separable seam section.

Then, in FIG. 13, the side panel 34 of FIG. 12 has been laid atop the front panel of FIG. 12 and a row of breakaway stitches 42, denoted by the row of "o", has been sewn along the overlying edges of the panels from T to A to B, inboard of the location of the previously sewn vertical seam 96. In this way, the vertical extending separable seam section 40 from A to B has been accomplished. In addition however, it is seen that this row of stitches advantageously extends above A, to the point designated "T" so that the seat cover seam can separate even above the point A if needed during air bag deployment.

Figure 14:
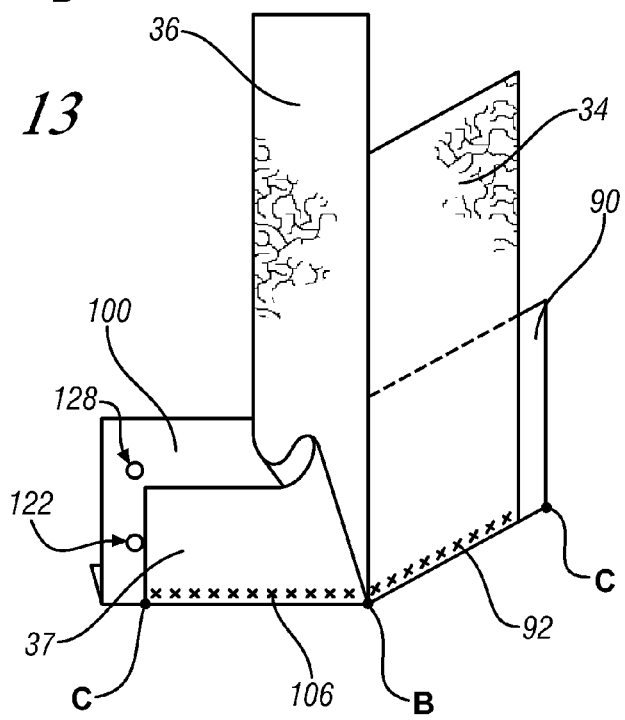
FIG. 14 shows how to maneuver the two subassemblies to allow the horizontal extending separable seam section to be sewn.

In FIG. 14, the assemblage of FIG. 13 is opened by lifting the outer chute 90 and the side panel 34 to the right. And the extension 37 is lifted up and folded onto the inner chute 100 to expose the horizontal row of stitches 106 along edge B-C.

Figure 15:
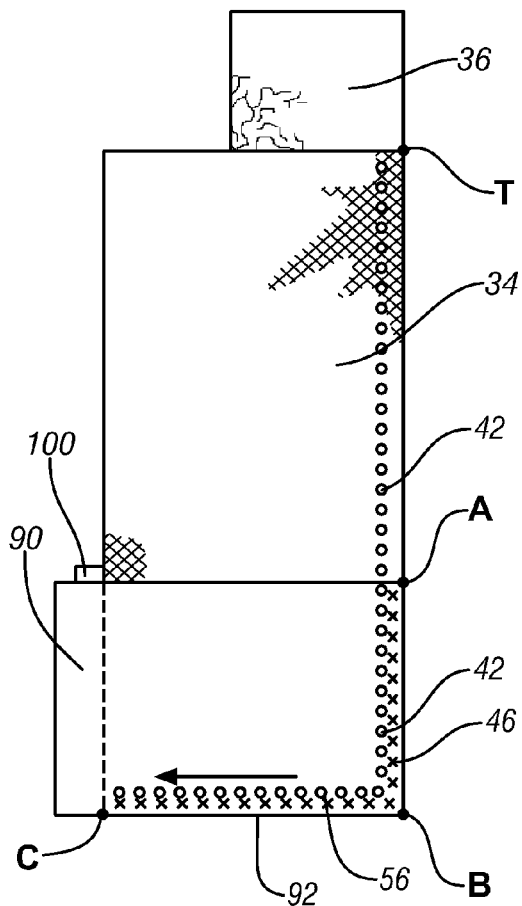
FIG. 15 shows the sewing of the horizontal extending separable seam section.

In FIG. 15, the outer chute 90 and the side panel 34 have been moved to the left again and placed back down on top of the front panel 34 and the folded lower extension 37, thus aligning the edges B-C on the lower extension 37 and the side panel 34. A row of breakaway stitches 56, denoted by the row of "o", is sewn from B to C, inboard of the location of the previously sewn horizontal seam 92, in order to form the horizontal extending breakaway seam. The sewing needle is left in the materials at point B as the materials are reoriented from the position of FIG. 13 to the position of FIG. 15. In this way the separable seam from A to B to C will be of a continuous thread. It will be understood that, if desired, the order of the sewing operations could be modified to sew the horizontal row of stitches 56 prior to the sewing of the vertical row of stitches 42, sewing from C to B to A, by performing the sewing of FIG. 15 prior to the sewing of FIG. 13 and in the reverse direction, with the two assemblies flipped over so that the side panel 34 and inner chute 100 are on top of the front panel 36, lower extension 37 and outer chute 90.

Figure 16:
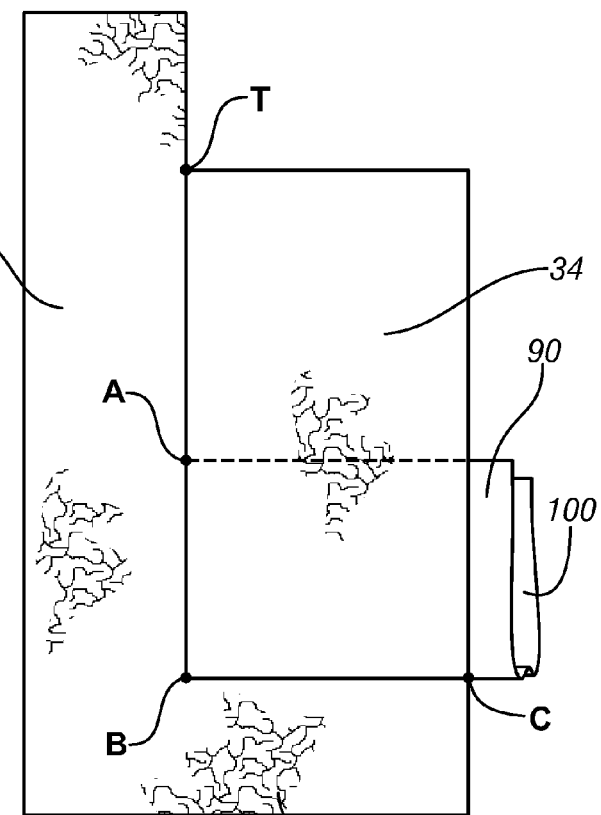
FIG. 16 shows the finished subassembly of the front panel, side panel and inner and outer chutes ready for sewing into the seat cover.

FIG. 16 shows the completed assembly of the front panel 36 and side panel 36 together with the inner chute 100 and outer chute 90 to form the L-shaped separable seam A-B-C, and ready for assembly with the additional panels that will make up the finished seat cover 32 of FIG. 1.

Figure 17:
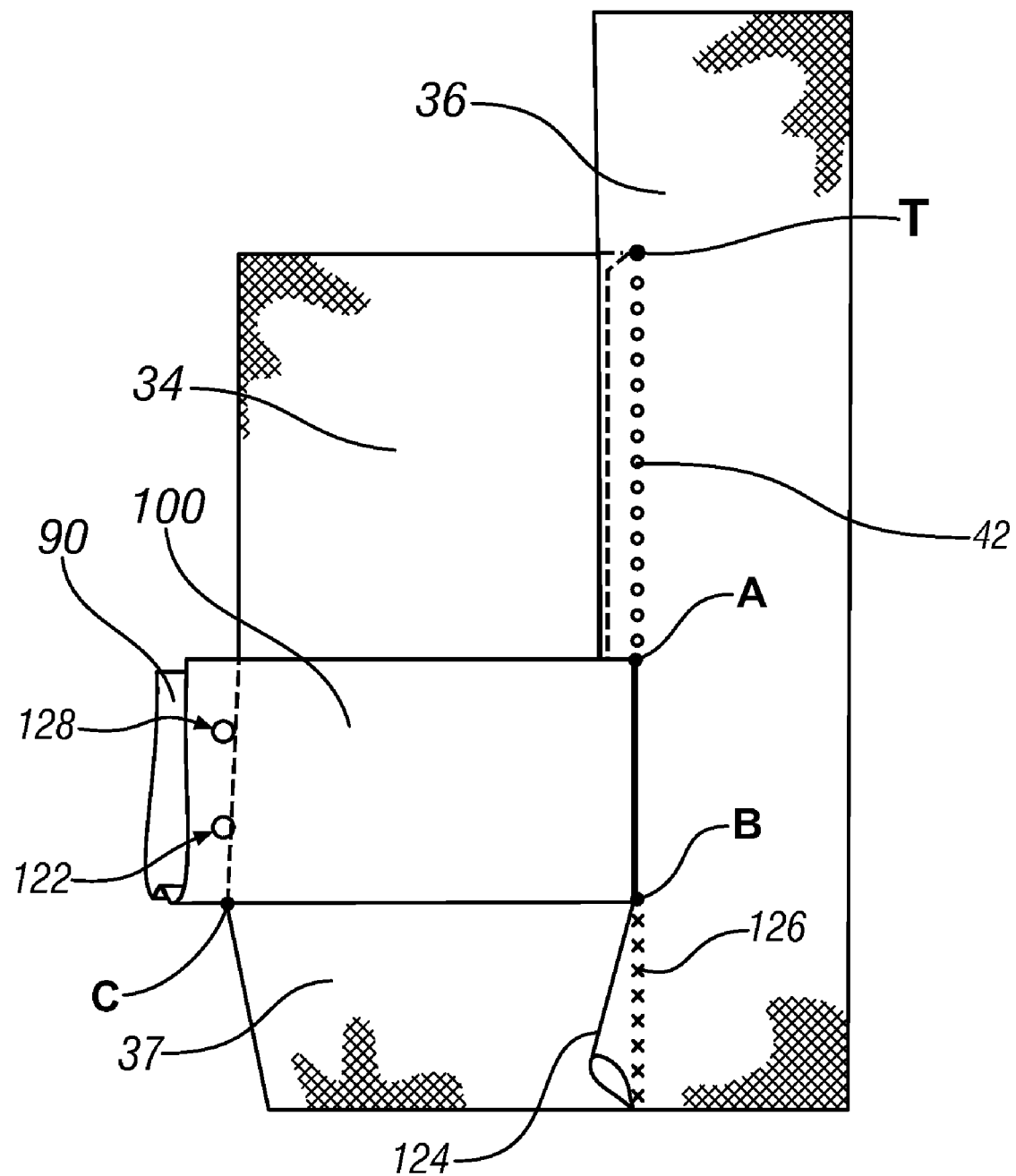
FIG. 17 shows the finished subassembly of FIG. 16 turned over, and the addition of a dart to better fit the cover to the seat.

Optionally as shown in FIG. 17, a dart 124 can be sewn with a line of stitches 126 between the front panel 36 and the front panel lower extension 37 to contour the seat cover 32 for a better fit to the seat back 14, and to visually complete the vertical seam section 40 for a better aesthetic appearance in the finished seat cover 32. In FIG. 17 the completed assembly of the front panel 36 and side panel 36 together with the inner chute 100 and outer chute 90 is shown turned over from the position of FIG. 16.

It will also be understood that the invention is not limited to the particular attachment of the air bag chute to the air bag housing that is shown in the examples of the drawings herein. Rather the inner ends of the air bag chutes can be anchored on the seat trim or on the seat structure or on the air bag housing. For example, U.S. patent application Ser. No. 12/335,726, filed 16 Dec. 2008, entitled Air Bag Chute Attachment shows several examples of air bag chute attachments that can be used in the present invention. In addition, the configuration of the seat panels may be different with additional sewn together pieces forming each panel. For instance, the front panel extension 37 could be a separate piece sewn to the front panel 36. In addition, the front panel 36 could have an additional upper extension that extends part way rearward along the side of the seat so that the separable vertical seam is moved off of the edge between the front seat surface and the side seat surface to a position more rearward on the side surface of the seat. In this manner, the separable seam would be contained completely on the side of the seat as shown in the co-pending U.S. patent application Ser. No. 12/144,712 filed Jun. 24, 2008, and entitled "Vehicle Seat Side Air Bag. This upper extension could consist of a separate piece sewn to the front panel 36 with a different seam than that of the separable tear seam.

What is claimed is:

1. A method for sewing a seat cover to provide a front panel and a side panel with a continuous L-shaped separable seam for air bag deployment comprising:

sewing the front panel and the side panel together with a continuous separable seam, with a vertical extending section and a horizontal extending section, that will break upon the air bag deployment to allow inflation of the air bag;

providing an inner chute to guide the deploying air bag to the continuous separable seam, said inner chute being made of a material that is less stretchable than the material of the trim cover and offering a smooth low friction surface to allow the low friction passage of the air bag against a foam cushion; and, prior to the sewing together of the front panel and the side panel, sewing together the front panel and the inner chute with permanent vertical extending and horizontal extending seams that will not break during air bag deployment.

2. The method of claim 1 further comprising providing an outer chute to guide the deploying air bag to the continuous separable seam, said outer chute being made of a material that is less stretchable than the material of the trim cover and offering a smooth low friction surface to allow the low friction passage of the air bag against the trim cover, and prior to the sewing together of the front panel and the side panel, sewing together the side panel and the outer chute with permanent vertical extending seams and horizontal extending seams that will not break during air bag deployment.

3. The method of claim 1 further comprising sewing a dart sewn between the front panel and a lower extension of the front panel, to contour the seat cover for better fit and aesthetic appearance.

4. The method of claim 1 further comprising the vertical separable seam portion being sewn at the edge of the seat between the front panel and the side panel.

5. The method of claim 1 further comprising the vertical separable seam portion being sewn entirely on the side panel with both an upper front panel extension and a lower front panel extension to locate the vertical separable seam portion away from the edge formed between the front panel and the side panel.

6. The method of claim 5 further comprising the front panel lower extension being a separate piece sewn to the front panel.

7. A method for sewing a seat cover to provide a front panel and a side panel with an L-shaped separable seam and an inner chute for air bag deployment comprising:

sewing the front panel and the inner chute together with permanent vertical extending and horizontal extending seams that will not break during air bag deployment;

and then sewing the front panel and the side panel together with separable vertical extending seams and horizontal extending seams that will break upon the air bag deployment to allow inflation of the air bag while the inner chute remains attached to the front panel to guide the deployment of the inflating air bag.

8. The method of claim 7 further comprising an outer chute for air bag deployment, and, prior to the sewing of the front panel and the side panel together with the separable vertical and horizontal seams, sewing the side panel and the outer chute together with permanent vertical extending seams and horizontal extending seams that will not break during air bag deployment.

9. The method of claim 7 further comprising sewing a dart sewn between the front panel and a lower extension of the front panel, to contour the seat cover for better fit and aesthetic appearance.

10. The method of claim 7 further comprising the vertical separable seam portion being sewn at the edge of the seat between the front panel and the side panel.

11. The method of claim 7 further comprising the vertical separable seam portion being sewn entirely on the side panel with both an upper front panel extension and a lower front panel extension to locate the vertical separable seam portion away from the edge formed between the front panel and the side panel.

12. The method of claim 7 further comprising the front panel having a lower extension provided by a separate piece sewn to the front panel.

13. A method for sewing a seat cover to provide a front panel and a side panel with an L-shaped separable seam and inner and outer chutes for air bag deployment comprising:

sewing the front panel and the inner chute together with permanent vertical extending and horizontal extending seams that will not break during air bag deployment;

sewing the side panel and the outer chute together with permanent vertical extending seams and horizontal extending seams that will not break during air bag deployment;

and then sewing the front panel and the side panel together with separable vertical extending seams and horizontal extending seams that will break upon the air bag deployment to allow inflation of the air bag while the inner chute remains attached to the front panel and the outer chute remains attached to the side panel to guide the deployment of the inflating air bag.

14. The method of claim 13 further comprising the separable vertical extending seams and horizontal extending seams being formed of a continuous thread.

\* \* \* \* \*